(12) United States Patent
Schwaighofer et al.

(10) Patent No.: US 8,204,838 B2
(45) Date of Patent: Jun. 19, 2012

(54) SCALABLE CLUSTERING

(75) Inventors: Anton Schwaighofer, Cambridge (GB);
Joaquin Quiñonero Candela, Cambridge (GB); Thomas Borchert, Cambridge (GB); Thore Graepel, Cambridge (GB); Ralf Herbrich, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 522 days.

(21) Appl. No.: 12/421,853

(22) Filed: Apr. 10, 2009

(65) Prior Publication Data
US 2010/0262568 A1 Oct. 14, 2010

(51) Int. Cl.
*G06F 15/18* (2006.01)
(52) U.S. Cl. ......................................... 706/12
(58) Field of Classification Search ............... 706/12
See application file for complete search history.

(56) References Cited

U.S. PATENT DOCUMENTS

| | | | |
|---|---|---|---|
| 6,581,058 B1 | 6/2003 | Fayyad et al. | |
| 6,952,688 B1* | 10/2005 | Goldman et al. | 706/45 |
| 7,246,125 B2* | 7/2007 | Bradley et al. | 1/1 |
| 7,480,640 B1* | 1/2009 | Elad et al. | 706/14 |
| 2003/0005258 A1* | 1/2003 | Modha et al. | 712/1 |
| 2003/0065635 A1 | 4/2003 | Sahami et al. | |
| 2007/0038659 A1 | 2/2007 | Datar et al. | |
| 2007/0118546 A1 | 5/2007 | Acharya | |
| 2007/0208772 A1 | 9/2007 | Harik et al. | |
| 2008/0004096 A1 | 1/2008 | Graepel et al. | |
| 2008/0114800 A1 | 5/2008 | Gazen et al. | |
| 2009/0132901 A1* | 5/2009 | Zhu et al. | 715/206 |

OTHER PUBLICATIONS

Arindam Banerjee, A Generalized Maximum Entropy, Journ. of Machine Learning Research, Aug. 25, 2004, pp. 1919-1986.*
Deepayan Chakrabarti, Fully Automatic Cross-Associations, ACM KDD '04, Aug. 25, 2004, pp. 79-88.*
Xiangdong Zhou, et al., Automatic Image Annotation by an Iterative Approach: Incorporating Keyword Correlations and Region Matching, ACM CIVR '07, Jul. 9, 2007, pp. 25-32.*
D. Foti et al., "Scalable Parallel Clustering for Data Mining on Multicomputers", IPDPS 2000, pp. 390-398, 2000.*
Yifan Chen, et al., "Advertising Keyword Suggestions Based on Concept Hierarchy", ACM WDSM '08, Feb. '08, pp. 251-260.*
Berkhin, "Survey of Clustering Data Mining Techniques", Accrue Software, Inc., San Jose, CA, pp. 1-56.
Bishop, "Pattern Recognition and Machine Learning" Springer Science+Business Media LLC, New York, NY, 2006, pp. 359-459.

(Continued)

*Primary Examiner* — Jeffrey A Gaffin
*Assistant Examiner* — Vincent Gonzales
(74) *Attorney, Agent, or Firm* — Lee & Hayes, PLLC

(57) ABSTRACT

A scalable clustering system is described. In an embodiment the clustering system is operable for extremely large scale applications where millions of items having tens of millions of features are clustered. In an embodiment the clustering system uses a probabilistic cluster model which models uncertainty in the data set where the data set may be for example, advertisements which are subscribed to keywords, text documents containing text keywords, images having associated features or other items. In an embodiment the clustering system is used to generate additional features for associating with a given item. For example, additional keywords are suggested which an advertiser may like to subscribe to. The additional features that are generated have associated probability values which may be used to rank those features in some embodiments. User feedback about the generated features is received and used to revise the feature generation process in some examples.

19 Claims, 16 Drawing Sheets

OTHER PUBLICATIONS

Frey et al., "Factor Graphs and Algorithms" Retrived on Feb. 16, 2009 at <<http://citeseerx.ist.psu.edu/viewdoc/download;jsessionid=0707B43B9795542E1D194C442DDFF76E?doi=10.1.1.27.4388&rep=rep1&type=pdf>>, pp. 1-15.

Govaert et al., "An EM Algorithm for the Block Mixture Model", IEEE Transactions on Pattern Analysis and Machine Intelligence, vol. 27, No. 4, Apr. 2005, pp. 643-647.

Henry, "Latent Structure Analysis at Fifty", Joint Statistical Meetings, Aug. 11, 1999, retrived at <<http://www.people.vcu.edu/~nhenry/LSA50.htm>>, pp. 1-8.

Kschischang et al., "Factored Graph and the Sum-Product Algorithm", IEEE Transactions on Information Theroy, vol. 47, No. 2, Feb. 2001, pp. 498-519.

McLachlan et al., "Finite Mixture Models", retrived on Feb. 16, 2009 at <<http://www.maths.uq.edu.au/~gjm/mmconpref.ps>>, pp. 1-20.

Patrikainen et al., "Subspace Clustering of High-Dimensional Binary Data", retrived at <<www.cs.helsinki.fi/u/mannila/postscripts/subberclust_final.ps>>, pp. 1-9.

* cited by examiner

| Advertisements (400) | Keyword Subscriptions (401) | |
|---|---|---|
| A1 | TV Shows | Office |
| A2 | TV Shows | |
| A3 | Office | Office furniture |
| A4 | Office catering | |

| Responsibility | Cluster (403) | Office (404) | TV Shows (404) | Office furniture (404) | Office catering (404) |
|---|---|---|---|---|---|
| 0.7 | 1 | 0.8 | 0.9 | 0.1 | 0.1 |
| 0.3 | 2 | 0.8 | 0.1 | 0.7 | 0.5 |

FIG. 4

| 400 Advertisements | 401 Keyword Subscriptions | | |
|---|---|---|---|
| A1 | TV Shows | Office | |
| A2 | TV Shows | | |
| A3 | Office | Office furniture | |
| A4 | Office catering | | |
| 500 A5 | Office | TV Shows | Comedy |

| 402 Responsibility | 403 Cluster | 404 Office | TV Shows | Office furniture | Office catering | 501 Comedy |
|---|---|---|---|---|---|---|
| 0.7 | 1 | 0.8↑ | 0.8↓ | 0.1↓ | 0.1↓ | 0.5↑ |
| 0.3 | 2 | 0.8↑ | 0.1↓ | 0.7↓ | 0.5↓ | 0.5↓ |

Sorting by mean:

| Keyword | Mean $\mu$ | Alpha $\alpha$ | Beta $\beta$ |
|---|---|---|---|
| pest control | 0.113 | 44 | 343 |
| altima | 0.074 | 84 | 1039 |
| maxima | 0.065 | 75 | 1080 |
| quest | 0.065 | 76 | 1090 |
| dealer | 0.051 | 61 | 1136 |

Sorting by positive ad pseudo-count $\alpha$

| Keyword | Mean $\mu$ | Alpha $\alpha$ | Beta $\beta$ |
|---|---|---|---|
| altima | 0.074 | 84 | 1039 |
| quest | 0.065 | 76 | 1090 |
| maxima | 0.065 | 75 | 1080 |
| dealer | 0.051 | 61 | 1136 |
| pest control | 0.113 | 44 | 343 |

FIG. 15

SCALABLE CLUSTERING

BACKGROUND

Clustering items based on some notion of similarity is a problem that arises frequently in many applications. For example, clustering documents into groups of related documents is required for information retrieval applications, document analysis applications and other tasks. The items to be clustered may be documents, emails, web pages, advertisements, images, videos, or any other types of items. Clustering may also be referred to as categorizing or classifying.

Some previous approaches have involved supervised classification schemes. In these schemes manual labeling of a significant portion of the items to be classified is required in order to train a machine learning system to carry out the classification automatically. However, this approach is not practical for very large collections of items such as in web-scale applications. In such situations, it is not practical to provide a manual labeling of a significant portion of the items.

Unsupervised clustering approaches are also known whereby the clustering system is free to create whatever categories best fit the data. Examples of such approaches include k-means clustering and agglomerative clustering. However, many of these approaches do not scale up well for large data sets (hundreds of thousands of items to be clustered into hundreds of clusters) in that the training times required are very long and/or the quality of the results are poor.

Another type of unsupervised clustering approach has involved forming a clustering model using a mixture of Bernoulli profiles and learning the optimal values of the model parameters using maximum likelihood methods. Such maximum likelihood methods include direct gradient ascent and expectation maximization (EM). However, such maximum likelihood methods require several passes over the data during training in order to converge and so these approaches are not suitable for extremely large data sets. In these approaches initialization is crucial due to multiple modes of the likelihood but this is very difficult to achieve in applications involving high dimensional data.

The embodiments described herein are not limited to implementations which solve any or all of the disadvantages of known clustering systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

A scalable clustering system is described. In an embodiment the clustering system is operable for extremely large scale applications where millions of items having tens of millions of features are clustered. In an embodiment the clustering system uses a probabilistic cluster model which models uncertainty in the data set where the data set may be for example, advertisements which are subscribed to keywords, text documents containing text keywords, images having associated features or other items. In an embodiment the clustering system is used to generate additional features for associating with a given item. For example, additional keywords are suggested which an advertiser may like to subscribe to. The additional features that are generated have associated probability values which may be used to rank those features in some embodiments. User feedback about the generated features is received and used to revise the feature generation process in some examples.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 is a is a schematic diagram of advertisements having keyword subscriptions and showing two clusters;

FIG. 5 is the schematic diagram of FIG. 4 showing an added advertisement;

FIG. 15 is a table of most prominent features in two different clusters;

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a clustering system for clustering keywords to which advertisements have subscribed, the system described is provided as an example and not a limitation. As those skilled in the art will appreciate, the present examples are suitable for application in a variety of different types of clustering systems.

Figure 1:
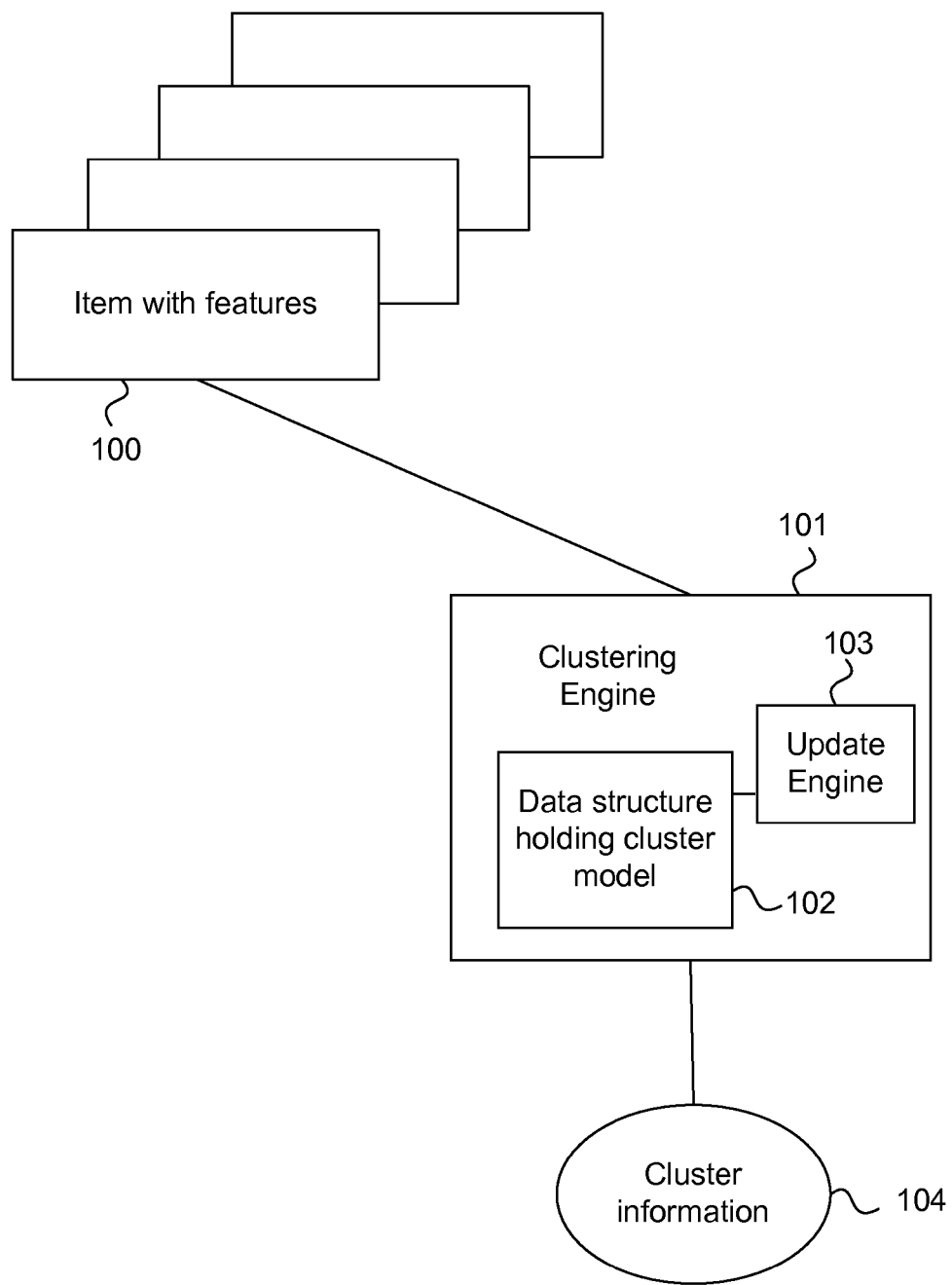
FIG. 1 is a schematic diagram of a clustering system.

FIG. 1 is a schematic diagram of a clustering system 101 which takes information about items 100 with features as input. For example, the items may be advertisements and the features may be keywords to which the advertisements have subscribed. However, this is not essential, the items may be text documents and the features may be text words in those documents. In other examples, the items may be images or video clips and the features may be visual words, textons, or other features. That is the items may be of any suitable type such as documents, files, emails, web pages, advertisements, audio files, voice messages, text snippets, images, names, or other items. The features are any characteristics associated with the items. In the embodiments described herein there is high dimensionality in the input to the clustering system since there are a high number of possible features for a given item (for example, hundreds to millions of possible features).

The input to the clustering system is provided in the form of binary vectors in the embodiments described herein. For example, if the items are documents and the features are text words the input for a given document is a vector of 1s and 0s with the 1's indicating text words that are present in the document. The 0's indicate text words which are absent from the document. In another example, the items may be stocks and the features may be prices that the stocks have sold at during a specified time interval. Ranges or "bins" of price values may be specified such that a binary vector may be formed for each stock and provided as input to the clustering system. In another example, the items are advertisements and the features are keywords to which the advertisement is subscribed. In this case the binary vector for an advertisement comprises 1's for each keyword that the advertisement subscribes to and 0's for each keyword that is absent from that advertisement's subscription.

The clustering system 101 comprises a clustering engine having a memory holding a data structure 102. The data structure holds a cluster model which begins in a default state and is trained using a large set of training data. The training data comprises binary vectors as described above. The training process is carried out by an update engine 103 which uses a Bayesian update process as described in more detail below. During the learning process parameters of the model are learnt as well as uncertainty about those model parameters. The clustering system 101 provides as output cluster information 104 such as details about the learnt clusters and parameters of the model. The model is arranged to take into account uncertainty about the model parameters and effectively to learn this uncertainty during the training or update process. Previous approaches have not been able to take uncertainty into account in this way.

Figure 2:
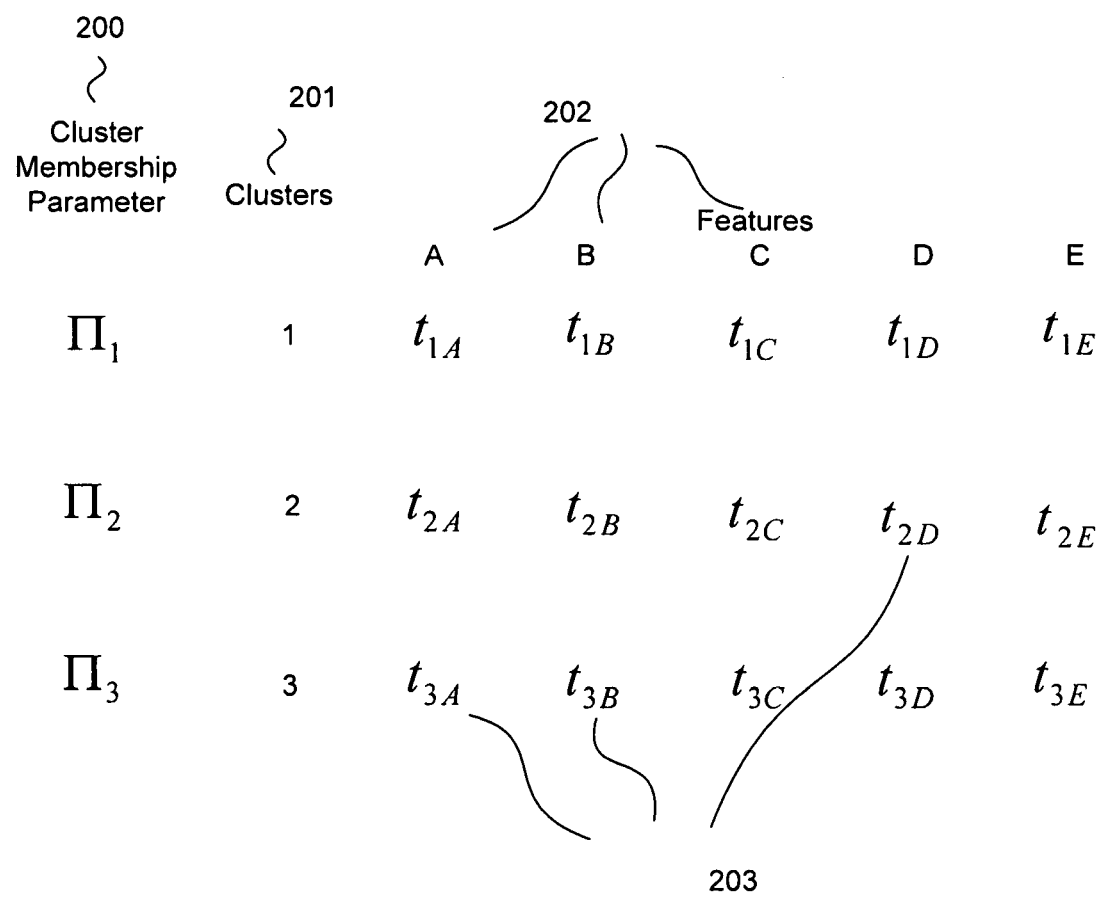
FIG. 2 is a schematic diagram of model parameters to be held in a data structure.

FIG. 2 illustrates details of the cluster model 102 in a schematic manner. The model comprises a plurality of clusters 201. Only three clusters are shown for clarity but in practice hundreds or thousands (or more) of clusters may be used. The number of clusters that are used depends on the particular application and the processing resources that are available. The model also comprises a cluster prior 200 for each cluster. This is a prior probability distribution representing belief that any one of the items is a member of that cluster. These cluster priors are stored using statistics (or parameters) which describe the prior cluster probability distribution. Any suitable type of probability distribution may be used to represent the cluster priors and in embodiments described herein Dirichlet distributions are used. However, this is not essential, other types of distribution may be used. By using cluster priors in this way the model has a "soft" representation of clusters because which items are members of a cluster is defined in a probabilistic way. When the model is initialized there is great uncertainty about which items are members of which clusters and as training progresses this uncertainty may reduce. The model is able to capture knowledge about this uncertainty because the cluster priors are parameters of the model.

The model also comprises a feature prior probability distribution 204 for each cluster 201 and feature 202 combination. For example, in FIG. 2 the feature prior probability distribution for cluster 1, feature A is $t_{1,A}$. The feature prior probability distribution $t_{1,A}$ represents belief that an item in cluster 1 has feature A. The feature priors are stored as statistics or parameters which describe the prior feature distribution. Any suitable type of probability distribution may be used to represent the feature priors and in the embodiments described herein Beta distributions are used. A Beta distribution may be described by parameters $\alpha$ and $\beta$ and these may be stored by the model for each of the feature priors. In order to provide a sparse representation, the feature prior probability distribution may be set to a default for many of the cluster and feature combinations. This is described in more detail below.

As mentioned above, the model begins in an initial state with the parameters set to default values. A learning or training process then takes place to train the model on a large data set. For example, the data set may comprise hundreds of thousands or more of items. The parameters of the model are treated as random variables. Inference comprises computing posterior distributions of the parameters, which capture the uncertainty about their true value. This allows to exert caution in the interpretation of parameter values about which much uncertainty remains. It also allows for experimental design, since the model declares what parameter values it is most uncertain about. In addition, it is sufficient if the training process accesses each data point (or item) only once. This enables the process to scale successfully to large corpora such as those typical in web applications.

Figure 3:
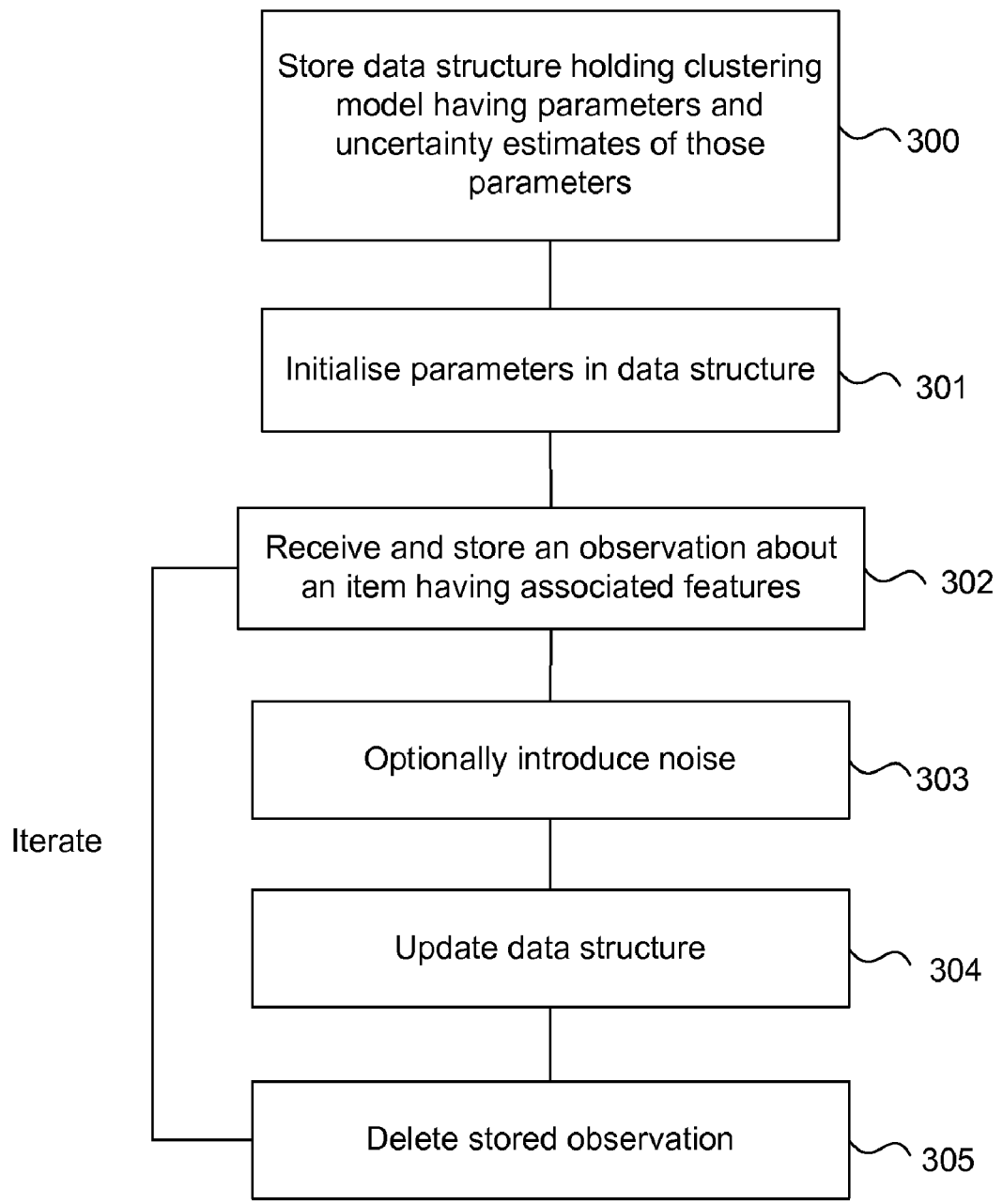
FIG. 3 is a schematic diagram of a method of training a clustering model.

FIG. 3 is a flow diagram of a method of training the cluster model 102. The clustering system stores 300 a data structure holding the cluster model. The cluster model has parameters as described above which capture uncertainty about their optimal value. The parameters are initialized 301 and the clustering system receives 301, from a store of items to be used for training, a first data point comprising an item having features. Noise is optionally introduced to the model parameters 303 and a Bayesian update process is used to update the prior probability distributions on the basis of the observation in order to obtain posterior probability distributions. The posterior distributions obtained after processing one data point are passed as prior distributions for processing the next data point. This is achieved by updating the data structure 304 and optionally deleting the stored observation 305. The process proceeds for the next data point as indicated in FIG. 3 and each data point need be processed only once. That is, the training process may be used to access each data point more than once if required but this is not essential.

FIG. 4 is a schematic diagram of advertisements 400 having keyword subscriptions 401 and showing two clusters 403 represented in a cluster model. For each cluster, feature priors 405 are shown for each feature 404 which in this example are keywords. Each cluster has a cluster prior (not shown). In this example, the keyword subscription prior Beta distribution for cluster 1, office has a mean of 0.8 indicating a relatively strong belief that any advertisement in cluster 1 subscribes to the keyword "office". In this example, only the means of the Beta probability distributions are shown although the method is able to take into account uncertainty in the belief about those mean values. Keyword subscription priors for the other cluster and feature combinations are also given.

Suppose the next data point is obtained from the training items and used to update the model during training. This is illustrated in FIG. 5 which is the same as FIG. 4 but showing another advertisement 500. This additional advertisement 500 has keywords "office", "TV shows" and "comedy". In this example, the keyword "comedy" has not been observed by the model before and so this keyword is added to each cluster with a default keyword subscription prior (shown as 0.5 in the example). The update process then takes place. During this update process a responsibility 402 is calculated for each cluster. The responsibility of a cluster can be thought of as the probability of that cluster generating a particular item (in this case advertisement 500). The responsibilities 402 sum to 1. The update process results in changes to the feature priors (in this case the keyword subscription priors) and this is indicated in FIG. 5 by the arrows 502. An upward pointing arrow indicates that a feature prior probability is increased by an amount represented by the size of the arrow. A downward pointing arrow indicates that a feature prior probability is decreased by an amount represented by the size of the arrow.

The magnitude of the update to a feature prior is related to the responsibility and also to the amount of uncertainty about that feature prior. For example, a feature prior which is known with relatively high certainty is less likely to be changed a lot by the update process than a feature prior which is very uncertain. Also, if the responsibility is high the magnitude of change to the feature prior is greater than for a low responsibility. After the update process for the single data point (advertisement 500) the responsibility values may be discarded and the process moves onto the next data point.

Figure 6:
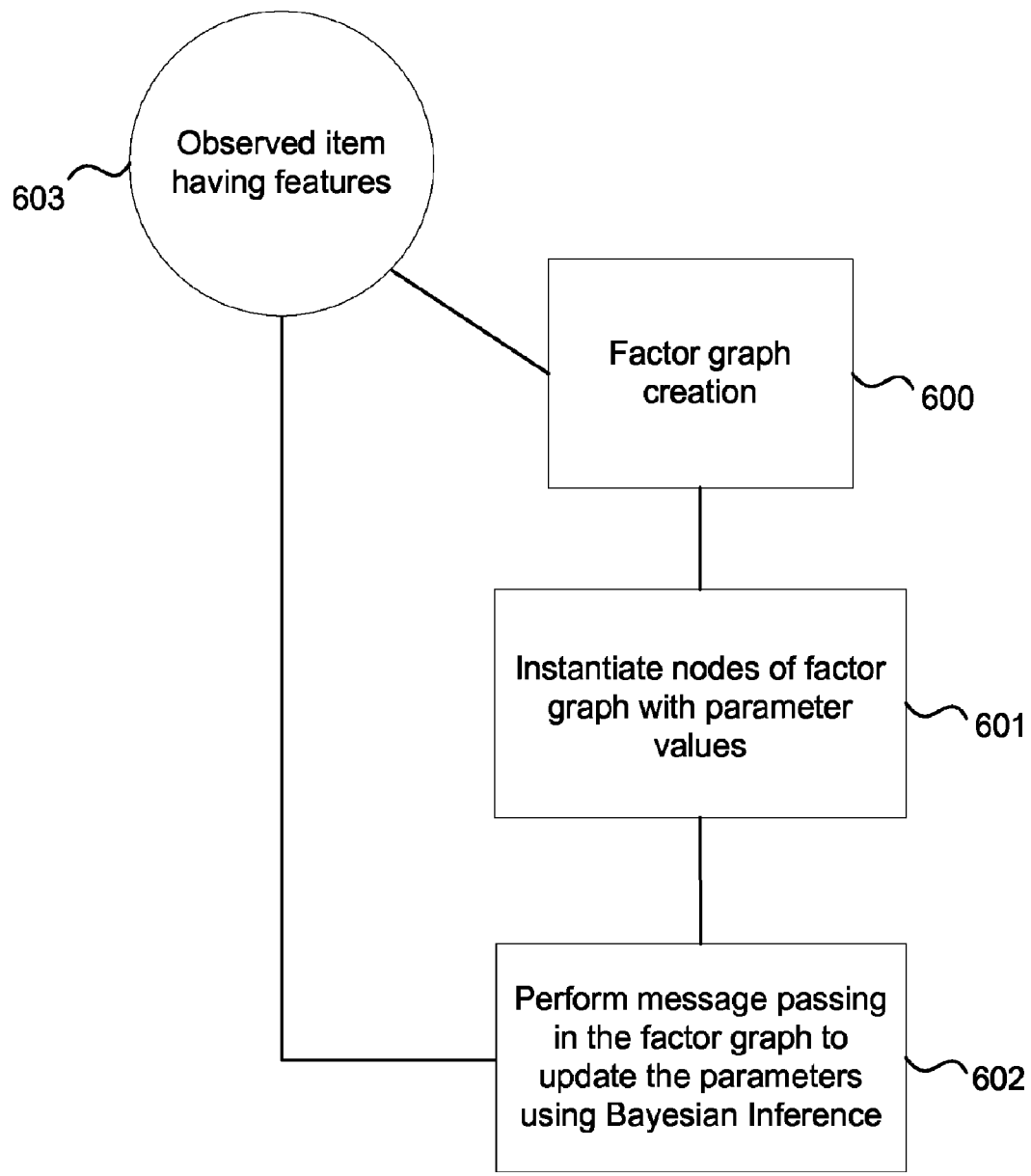
FIG. 6 is a flow diagram of a method of training a clustering model.

The cluster model may be stored in the data structure as a factor graph. With reference to FIG. 6 a factor graph is created 600 and nodes of the factor graph are instantiated 601 with default parameter values of the model. During training a first item is taken from the training item set and information about this "observed" item 603 is input to the factor graph. Message passing may be performed 602 on the factor graph to update the parameters using Bayesian inference. The process then moves to the next item in the training set and repeats until each item from the training set has been processed once.

Figure 8:
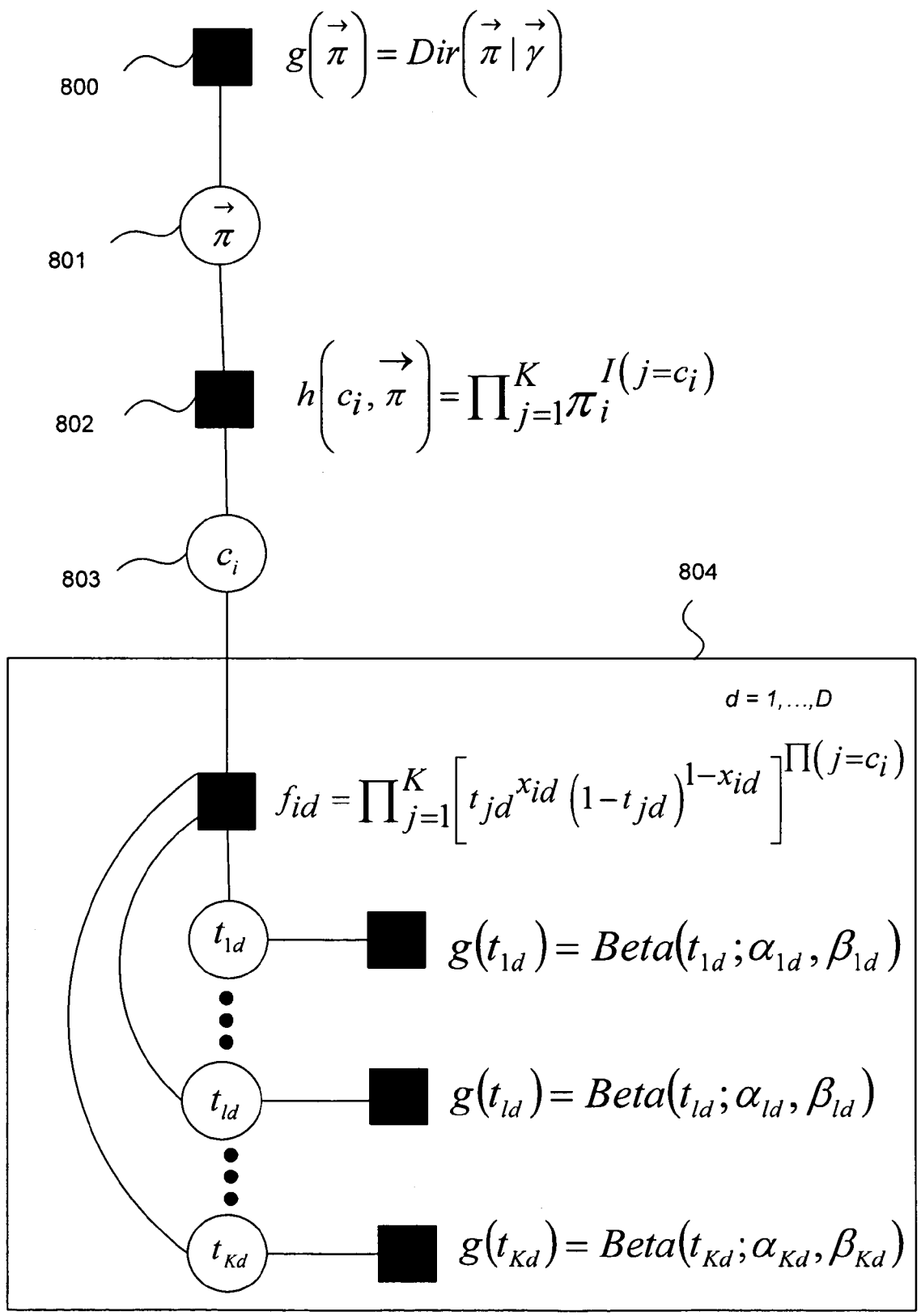
FIG. 8 is an example factor graph for use in a clustering system.

Part of an example factor graph for use in the cluster model is illustrated in FIG. 8 and is described in more detail later in this document.

A detailed example of a clustering system is now described in which the items are advertisements and the features are keywords that the advertisements are subscribed to. However, it is noted that this example is also applicable to other types of items and features.

Consider a set of N objects, where the i-th object is $\vec{x}_i$ is described by a D-dimensional vector of binary variables. In a concrete application, these objects are online ads in paid search, described by the set of keywords to which they subscribe. There are a total of D unique keywords, and vector $\vec{x}_i$ contains a 1 for those keywords that the i-th advertisement has subscribed to: If the i-th advertisement subscribed to the d-th keyword, then $x_{id}=1$, else $x_{id}=0$.

The keyword vector of an ad is generated by one of K clusters, or mixture components. Each ad $\vec{x}_i$ has a variable $c_i \in \{1, \ldots, K\}$ associated with it that indicates the index of the cluster to which the ad belongs. If the i-th ad belongs to cluster j then $c_i = j$. Within a cluster, ads subscribe to keywords following independent Bernoulli probability distributions. If the i-th ad belongs to cluster j then the probability that it subscribes to the d-th keyword is given by $t_{jd} = p(x_{id}=1|c_i=j)$. As a result, the probability that the i-th ad belongs to cluster j is given by a cluster-dependent Bernoulli profile:

$$p(\vec{x}_i \mid c_i = j) = \prod_{d=1}^{D} t_{jd}^{x_{id}} (1 - t_{jd})^{1-x_{id}}.$$

Which cluster an ad belongs to is unknown a priori, and that uncertainty is captured by the prior probability that the i-th ad (or in fact any other ad) belongs to cluster j: $\pi_j = p(c_i = j)$. If the cluster priors $\{\pi_j\}$ and the probabilities of subscribing to keywords $\{t_{jd}\}$ are known, the sampling distribution of the model is given by a mixture of Bernoulli profiles:

$$p(\vec{x}_i \mid \{t_{jd}\}, \{\pi_j\}) = \sum_{j=1}^{K} p(c_i = j) \prod_{d=1}^{D} p(x_{id} \mid c_i = j, t_{jd}) \quad (1)$$

$$= \sum_{j=1}^{K} \pi_j \prod_{d=1}^{D} t_{jd}^{x_{id}} (1 - t_{jd})^{1-x_{id}}$$

Sampling an ad from this model involves selecting first one of the K clusters by drawing it from a discrete distribution with parameter vector $\vec{\pi} = [\pi_1, \ldots, \pi_K]$. In a second step, keywords that the ad subscribes to are drawn from the selected cluster's Bernoulli profile.

For the mixture of Bernoulli profiles presented here, the Bernoulli probabilities of keyword subscription are given conjugate prior Beta distributions $t \approx \text{Beta}(t; \alpha, \beta)$. The parameters $\alpha$ and $\beta$ can be interpreted as pseudo-counts: $\alpha$ as the number of times the keyword was switched on and $\beta$ has the number of times the keyword was off. The probability density function (PDF) of the keyword subscription probability t is $$p(t) = \text{Beta}(t; \alpha; \beta) = \frac{\Gamma(\alpha + \beta)}{\Gamma(\alpha)\Gamma(\beta)} t^{\alpha-1} (1 - t)^{\beta-1}.$$

The higher the sum of the pseudo-counts, the smaller the uncertainty about the value of t.

The other unknown variables of interest are the prior cluster probabilities $\{\pi_j\}$; these are given a Dirichlet prior distribution, $$\vec{\pi} \approx \text{Dir}(\vec{\pi} \mid \vec{\gamma})$$

with parameter vector $\vec{\gamma}$. Similar to the Beta distribution, $\gamma_j$ can be interpreted as a pseudo-count of the number of ads that belong to cluster j.

Figure 7:
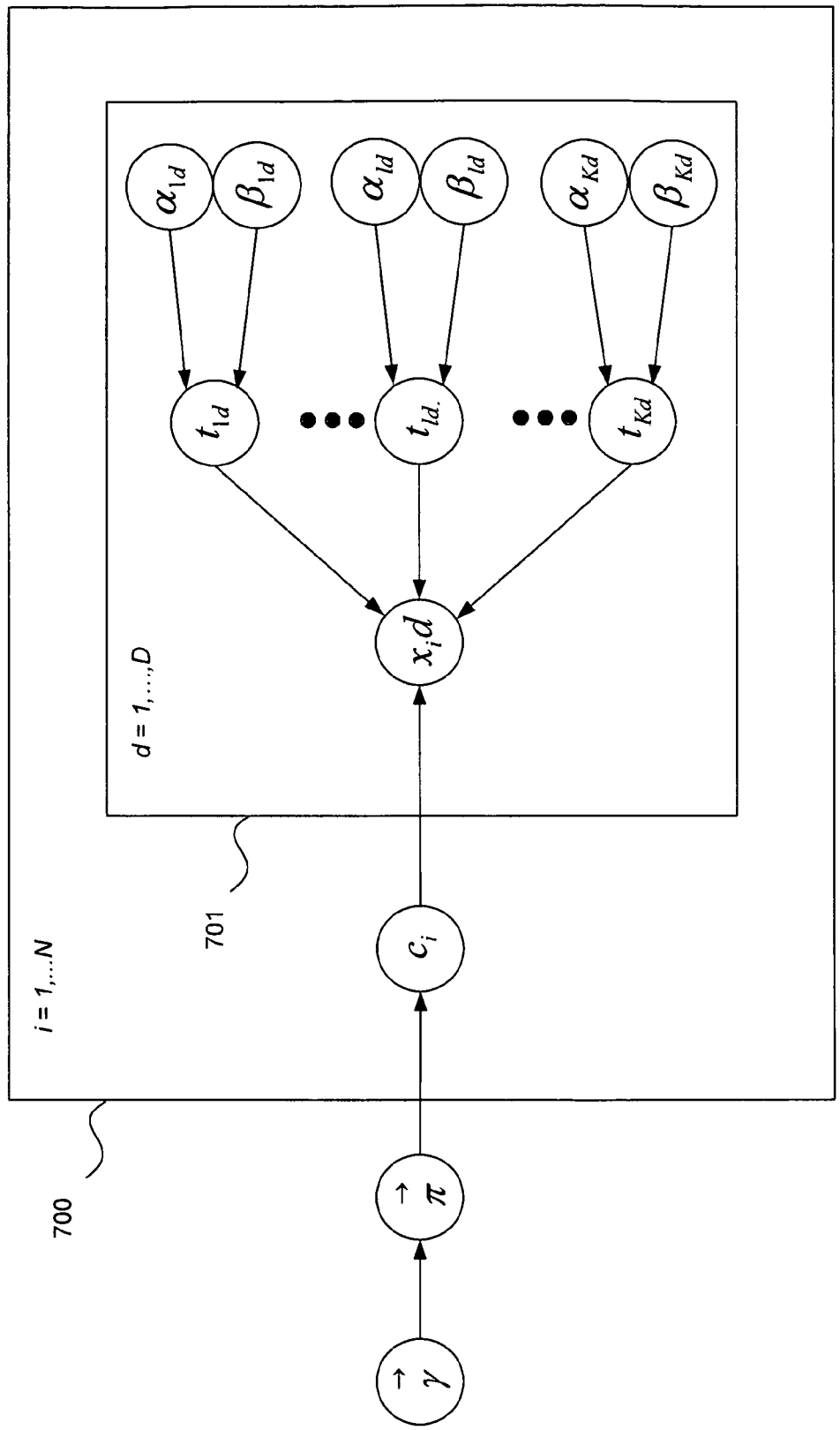
FIG. 7 is an example directed graphical model for use in a clustering system.

FIG. 7 shows the directed graphical model corresponding to the full Bayesian model, including the parameters of the Beta and Dirichlet distributions. The parts of the graph enclosed in plates 700, 701 are replicated according to the index in the plate. For example, for the fixed value of i in the outer plate, the inner plate is replicated D times, once for each value of the keyword index d. The arrows indicate the dependencies between variables.

The graph representation has the advantage of clearly revealing conditional independence between variables, which is important for computing the marginal posterior distributions efficiently. FIG. 8 shows the factor graph representation of a slice of the directed graph in FIG. 7 for a single datapoint indexed by i. Factor graphs are bipartite graphs that represent joint probability distributions by means of variable nodes (circles) 801, 803 connected to factor nodes (shaded squares) 800, 802. Factor nodes express the functional relation among the variables connected to them, and the product of all factors corresponds to the joint probability distribution. Marginal distributions are obtained by computing messages from factor nodes to variable nodes: the marginal distribution of any given variable nodes is the product of its incoming messages. Inference in factor graphs is thus known as message passing which is described in detail in Bishop, C. M. "Pattern Recognition and Machine Learning" Springer 2006 which is incorporated herein by reference in its entirety. The representation in FIG. 8 absorbs the observed variables $x_{id}$, d=1, ..., D into the factors $f_{id}$. The marginals of the cluster assignment probabilities $\vec{\pi}$ and of the keyword subscription probabilities $t_{jd}$ obtained by message passing are thus the posterior distributions desired.

The factor graph in FIG. 8 represents only a single ad, but already contains on the order of D×K variables, with the number of keywords D potentially in the millions, and the number of clusters K in the hundreds. Most keywords are actually key phrases, akin to typical search engine queries, which is why D can become so large. The full graph further replicates this slice N times (number of training data), with N in the tens of millions. It is not practical to store a graph that size in memory, or to compute and store the necessary messages.

To make the inference practical, an online learning scheme is used based on approximate inference with Assumed Density Filtering (ADF). Data points (ads) are processed one at a time, and the posterior distributions of $\vec{\pi}$ and $t_{jd}$ obtained after processing one data point are passed as prior distributions for processing the next data point.

Because the factor graph is a tree in this online learning scenario, messages only need to be computed once from a root node to the leaves and back. A practical schedule for processing the i-th data point is the following:

Set the prior distributions $g(t_{ld})$ and $$g(\vec{\pi})$$

to the posterior marginals on $t_{jd}$ and $\vec{\pi}$ obtained from processing the previous datapoint.

Compute the messages $$\{m_{f_{id} \to c_i}(c_i)\}_{d=1}^{D}$$

from the keyword factors $f_{id}$ to the cluster assignment variable $c_i$.

Compute the message $$m_{h \to \vec{\pi}}(\vec{\pi})$$

from the cluster assignment factor $$h(c_i, \vec{\pi})$$

to the cluster assignment probability variable $\vec{\pi}$.

Compute the message $m_{h \to c_i}(c_i)$.

For each keyword factor $f_{id}$ compute the outgoing messages $\{m_{f_{id} \to t_{ld}}(t_{ld})\}d^D=1$.

Compute the new marginals $$\{p(t_{ld} | \vec{x_i})\}_{d=1}^{D} = 1 \text{ and } p(\vec{\pi}).$$

Note that no messages need to be stored between the ADF steps, but only on the order of D×K marginal distributions.

The message from $f_{id}$ to $c_i$ is given by $$m_{f_{id} \to c_i}(c_i) = \prod_{j=1}^{K} \left[ \mu_{jd}^{x_{id}} (1 - \mu_{jd})^{1-x_{id}} \right]^{II(c_i=j)}, \quad (2)$$

where $$\mu_{jd} = \frac{\alpha_{jd}}{\alpha_{jd} + \beta_{jd}}$$

is the mean of $g(t_{ld})$, and $II(\cdot)$ is the indicator function, equal to 1 if its argument is true, and to 0 if it is false. The message from $c_i$ to factor h is $m_{c_i \to h}(c_i) = \Pi_{d=1}^{D} m_{f_{id} \to c_i}(c_i)$, and therefore the message from factor $$h \text{ to } \vec{\pi} \text{ is } m_{h \to \vec{\pi}}(\vec{\pi}) = \sum_{l=1}^{K} \pi_l \prod_{d=1}^{D} \mu_{ld}^{x_{id}} (1 - \mu_{ld})^{1-x_{id}}.$$

The message from h to $c_i$ sends the (scaled) average cluster assignment probabilities under the Dirichlet prior $$g(\vec{\pi})$$

$$m_{h \to c_i}(c_i) = \prod_{j=1}^{K} \gamma_j^{II(c_i=j)}$$

In some embodiments a parameter referred to as a responsibility is optionally computed as an intermediate step. This is the marginal distribution of the cluster index. This responsibility can be thought of as the probability that a given cluster will generate a particular ad as discussed above with reference to FIG. 5. The marginal distribution of $c_i$, given by the normalized product of its incoming messages is:

$$r_{il} = p(c_i = l \mid \vec{x}_i) = \frac{\gamma_l \prod_{d=1}^{D} \mu_{ld}^{x_{id}} (1 - \mu_{ld})^{1-x_{id}}}{\sum_{j=1}^{K} \gamma_j \prod_{d=1}^{D} \mu_{jd}^{x_{id}} (1 - \mu_{jd})^{1-x_{id}}}, \quad (3)$$

and referred to here as the responsibility of cluster l for advertisement i, with $0 \leq r_{il} \leq 1$ and $\Sigma_{j=1}^{K} r_{ij} = 1$.

The message from $f_{ld}$ to $t_{ld}$ can be written as the linear combination of a Bernoulli distribution in $t_{ld}$ and a constant:

$$m_{f_{id} \to t_{ld}}(t_{ld}) = r_{il} \frac{t_{ld}^{x_{id}} (1 - t_{ld})^{1-x_{id}}}{\mu_{ld}^{x_{id}} (1 - \mu_{ld})^{1-x_{id}}} + (1 - r_{il}). \quad (4)$$

Given that the message (4) from $f_{id}$ to the $t_{ld}$ nodes is a mixture Beta distribution plus a constant, the marginal distribution of $t_{ld}$ is therefore not a Beta distribution either, $$p(t_{ld}) \propto m_{f_{id} \to t_{ld}}(t_{ld}) \cdot m_{g_{ld} \to t_{ld}}(t_{ld}) = \quad (5)$$
$$r_{il} \text{Beta}(t_{ld}; \alpha_{ld} + x_{id}, \beta_{ld} + (1 - x_{id})) + (1 - r_{il}) \text{Beta}(t_{jd}; \alpha_{jd}; \beta_{jd})$$

Instead, it is the convex combination of the prior and the posterior Beta distributions on $t_{ld}$ under the assumption that the current advertisement belongs to cluster l. The posterior has larger weight the larger the responsibility of cluster l.

In order to keep the message $m_{t_{ld} \to f_{id}}(t_{ld})$ in the Beta family, the marginal $p(t_{ld})$ itself may be projected onto a Beta distribution by moment matching. For the first order moment of the marginal, $$M_1(x_{id}) = r_{il} \frac{\alpha_{ld} + x_{id}}{\alpha_{ld} + \beta_{ld} + 1} + (1 - r_{il}) \frac{\alpha_{ld}}{\alpha_{ld} + \beta_{ld}}$$

and for the second non-central moment, $$M_2(x_{id}) =$$
$$r_{il} \frac{(\alpha_{ld} + x_{id})(\alpha_{ld} + x_{id} + 1)}{(\alpha_{ld} + \beta_{ld} + 1)(\alpha_{ld} + \beta_{ld} + 2)} + (1 - r_{il}) \frac{\alpha_{ld}(\alpha_{ld} + 1)}{(\alpha_{ld} + \beta_{ld})(\alpha_{ld} + \beta_{ld} + 1)}$$

Note that the first order moment, i.e., the mean of the marginal, is a convex combination of the prior mean and the posterior mean under a full update of the Beta distribution (without taking the responsibility term $r_{il}$, into account). Using the expressions of the parameters of a Beta distribution in terms of its moments, the parameters of the approximating Beta are computed as $$\tilde{\alpha}_{ld} = M_1(x_{id}) \tilde{N},$$
$$\tilde{\beta}_{ld} = [1 - M_1(x_{id})] \tilde{N},$$

where $$\tilde{N} = \frac{M_1(x_{id}) - M_2(x_{id})}{M_2(x_{id}) - M_1(x_{id})^2} = \tilde{\alpha}_{ld} + \tilde{\beta}_{ld}$$

is the updated pseudo-count (including pseudo-count coming from the prior), roughly the total number of observed ads.

The exact marginal distribution of $\vec{\pi}$ is a mixture of Dirichlet distributions, $$p(\vec{\pi}) = \sum_{l=1}^{L} r_{il} Dir(\vec{\pi} \mid \vec{\gamma} + \vec{e}_l),$$

where $\vec{e}_l$ is the i-th unit vector of length K. There is one Dirichlet mixture per cluster, and its value is the result of assuming that the corresponding cluster is fully responsible for the ad visited. The mixing coefficients are the actual responsibilities that the clusters had for the ad. An approximation is made to stay in the family of Dirichlet distributions. For example, the means are preserved and it is ensured that the sum of the $\gamma_j$ is increased by one. This can be achieved by adding the cluster responsibilities to the corresponding parameters of the Dirichlet distribution, $\gamma_j^{new} = \gamma_j + r_{ij}$.

As described above using ADF to process a single data point at a time leads to large saving in terms of computation time and memory use. Even within this online learning framework, clustering large datasets is computationally demanding. A typical dataset can contain millions of advertisements with millions of unique keywords. If every cluster contained one Beta distribution for every possible keyword then the memory requirements would be on the order of hundreds of gigabytes. In addition, the computation of the responsibility for each advertisement would involve tens of millions of terms, which would make training extremely slow. Several steps may be taken to ensure that the clustering system can run in a reasonable amount of time and use a reasonable amount of memory.

While there are potentially millions of unique keywords in a dataset, individual advertisements are very sparse, typically subscribing to on the order of ten keywords each. If one assumes that a cluster of similar ads should also be sparse, then that property can be exploited by using a sparse representation for the clusters. This property also applies to other application domains for other types of items and features. However, the example here is discussed with reference to ads and keywords for clarity. In this representation, only keywords that are "important" to a cluster are represented by explicit Beta distributions, and all other keywords are represented by that same single "default" Beta distribution for that cluster. "Important" here is a combination of 1) being contained in a significant number of that ads in the cluster, and 2) being sufficiently discriminative for that cluster. If every cluster contains hundreds of unique distributions instead of millions then the model will use a small amount memory, and computation of equations (3) can be done quickly. Several steps may be taken to ensure that the model remains sparse.

Figure 9:
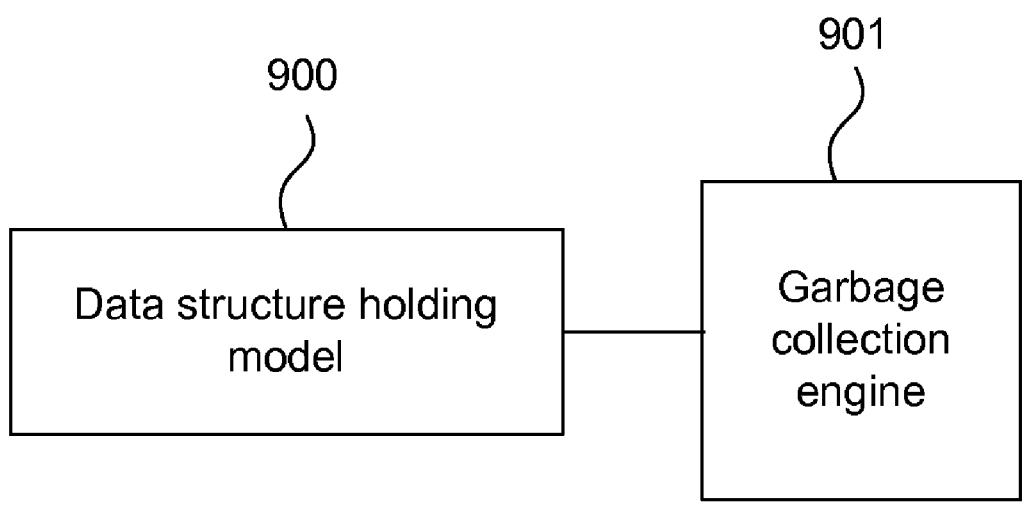
FIG. 9 is a schematic diagram of a clutter cluster engine and a garbage collection engine.

FIG. 9 is an example of part of a clustering system in which the data structure holding the model 900 is in communication with a clutter cluster 901 and a garbage collection engine.

Figure 10:
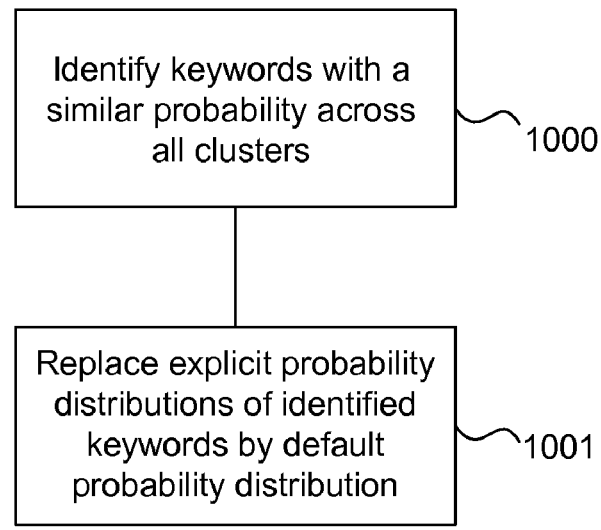
FIG. 10 is a flow diagram of a method at a garbage collection engine.
Figure 11:
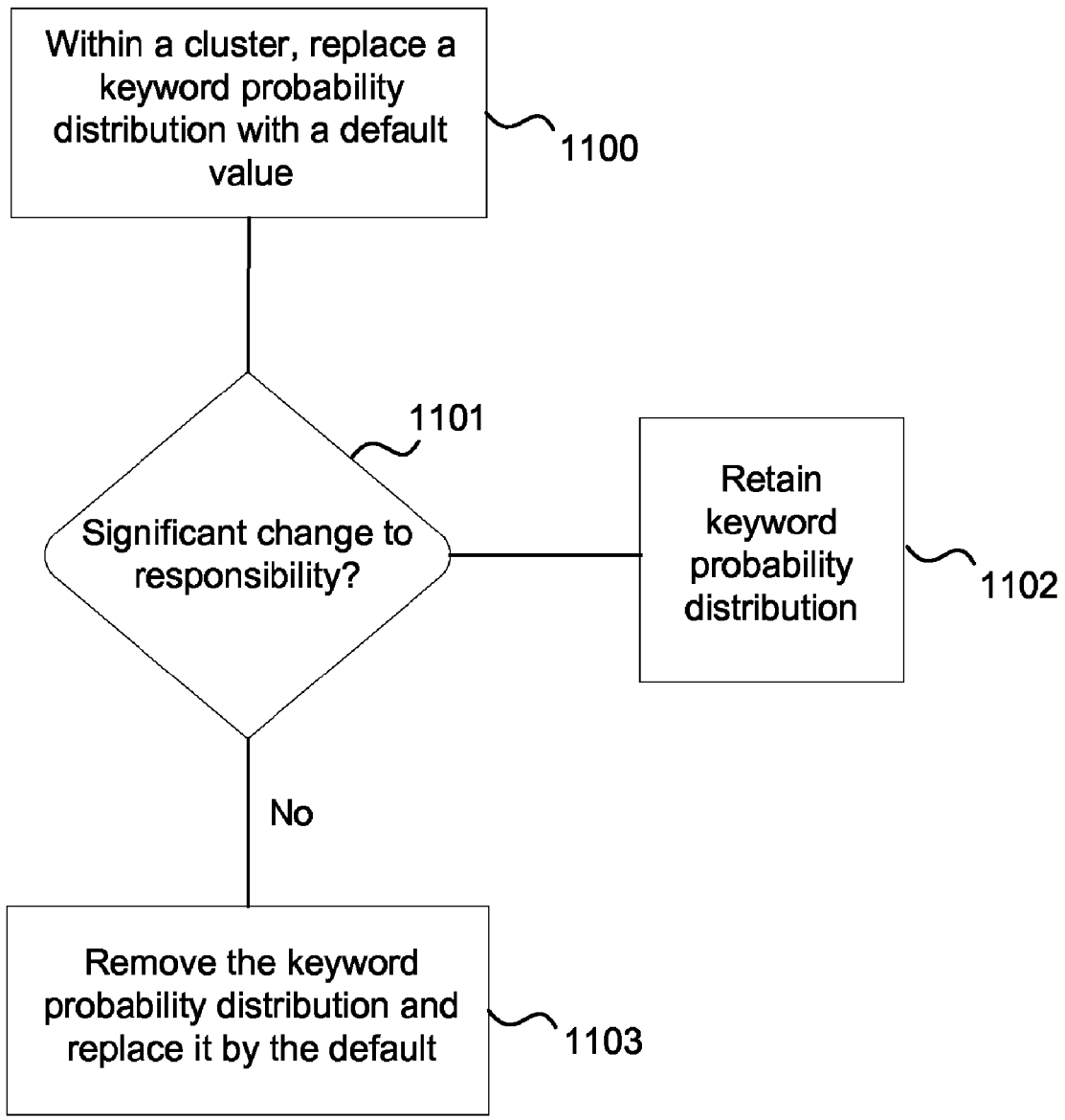
FIG. 11 is a flow diagram of another method at a garbage collection engine.

The garbage collection engine 901 may be arranged to carry out any or both of the methods of FIGS. 10 and 11 for example. These methods (or other similar methods) may be carried out at intervals to cull features (such as keywords) from the model. For example, as illustrated in FIG. 10 keywords with a similar probability across all clusters may be identified 1000. These may be keywords with a similar mean of the associated Beta distribution. The explicit probability distributions of the identified keywords may be replaced 1001 by a default probability distribution.

FIG. 11 is a flow diagram of a method carried out within a cluster. A keyword probability distribution within that cluster is replaced 1100 (for test purposes at this stage rather than actual replacement) by a default probability distribution. If a significant change to the responsibility occurs as a result 1101 then the keyword probability distribution is retained 1102. Otherwise the keyword probability distribution is removed and replaced by the default 1103.

In some embodiments the cluster model comprises a clutter cluster although this is not essential. A clutter cluster may be used as part of the cluster model in order to avoid pressing new concepts into clusters that are not appropriate for that information. For example, suppose there are two clusters, one about books and one about DVDs. A new ad is observed about baby food. A responsibility value is calculated as described above for the baby food ad with respect to each of the two clusters. The sum of the responsibility values is required to be 1 as previously explained and so the new ad is given a responsibility of 0.5 for each of the two clusters. In the case that a clutter cluster is provided the clutter cluster will have a higher responsibility value for the baby food ad. The clutter cluster is arranged so that it does not specialize on a particular group of features. In this way the baby food ad will effectively "disappear".

Figure 12:
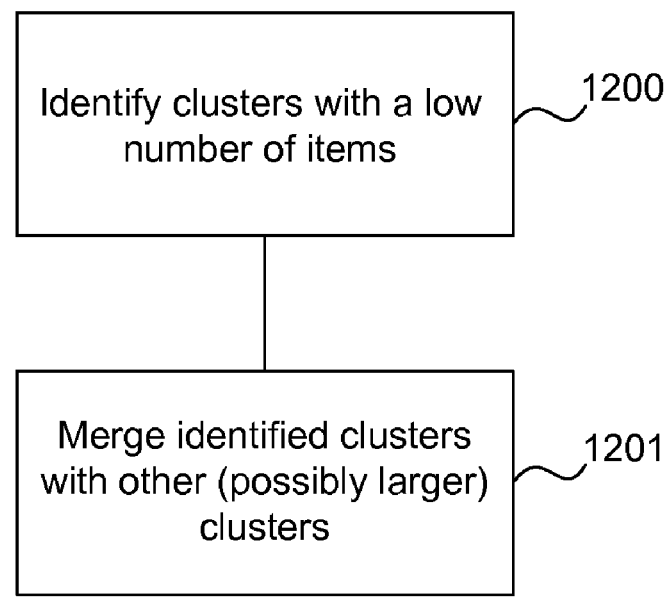
FIG. 12 is a flow diagram of another method at a garbage collection engine.

FIG. 12 is a flow diagram of an example method carried out during garbage collection. Clusters likely to contain a low number of items are identified 1200 and merged with other (possibly larger) clusters. For example, in a case with ten different specialized clusters a clutter cluster may be added to account for any examples which do not fit into one of the other ten clusters. This clutter cluster is given a single Beta distribution in order that it does not specialize on a particular group of features. In an example, consider two large clusters, one about office furniture and one about office spaces. A tiny cluster for office catering also exists. During a garbage collection process with respect to the small cluster, the garbage collection engine may decide to merge that tiny cluster with the office furniture cluster. In other cases the garbage collection may decide to merge the tiny cluster with a clutter cluster. A rule-based system may be provided in the garbage collection engine to decide which approach to take in different situations depending on the number, type, size and other factors about the current state of the cluster model and/or the particular application.

Figure 13:
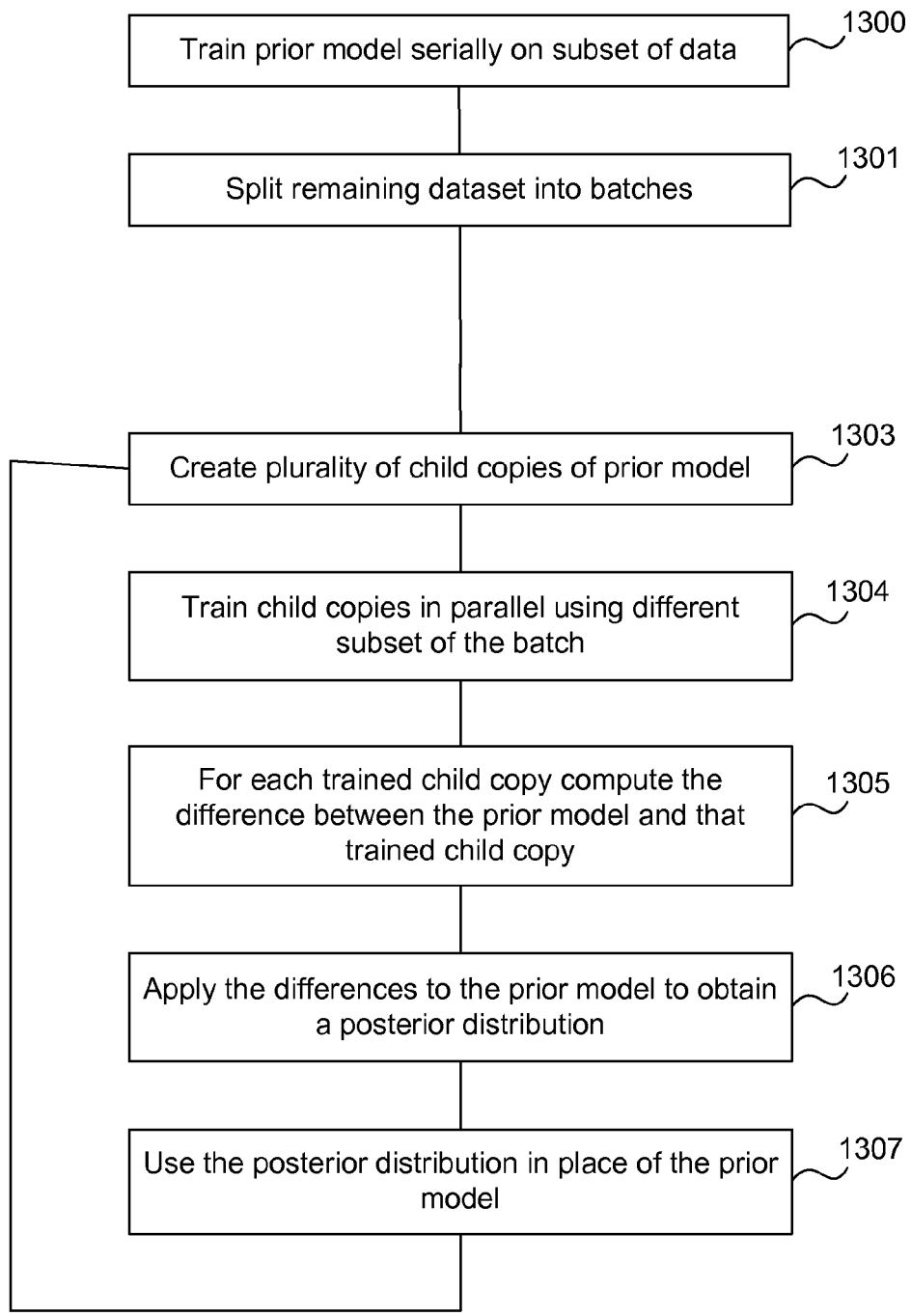
FIG. 13 is a flow diagram of a method of training a clustering system using parallel processing.

In some embodiments the clustering system comprises a plurality of processors arranged to assist with the process of training the cluster model. The processors may be provided at a multi-core computer or may be separate entities in a distributed computing environment. FIG. 13 is a flow diagram of an example method at such a clustering system. The model in its initial state (before training) is first trained serially 1300 as described above with reference to FIG. 3. At this stage the model is referred to as the "prior model" for ease of reference. The serial training is carried out using a subset of the available training data. The remaining (as yet unused) training data is split 1301 into batches and a plurality of child copies of the prior model are formed 1303. The training data is split into more batches than there are child copies of the model. The child copies are trained 1304 in parallel using a different batch of training data for each child copy and using the training method described above with reference to FIG. 3. For each trained child copy a difference is then computed between the prior model and that trained child copy 1305. This difference is computed by dividing the child's posterior distribution by the prior distribution. This delta is a message that tells the prior how to update itself to be equal to the child's posterior. The differences obtained from each of the children are applied to the prior, in order to collect the information learned by all children. That difference is applied to the prior model to obtain a posterior distribution 1306. The posterior distribution is used in place of the prior model. New child copies are created using the updated prior model and the training process is repeated using batches of training data that have not yet been used. This process carried on until all the batches are used. As more batches than child models are used the models that the children build up do not drift too far apart and are consolidated at regular intervals.

If the parallel copies of the model settle on different modes then a given cluster in one copy is unlikely to describe the same natural cluster as the corresponding cluster in another copy. To address this, the training is started with only one process initially, until the cluster models have formed at least partially. This may be referred to as a "differentiation step" and it reduces the freedom of the parallel copies of the model to settle on different modes which is a significant problem as the model is multi-modal. The differentiation step is only needed before the very first parallel step and not in subsequent parallel steps. Also, because the parallel training is carried out one batch at a time, and after each batch the posterior produced in step 1306 is used as the prior, then multiple copies of a single cluster cannot drift too far apart during the parallel training phase.

In some embodiments a feature suggestion apparatus is provided for suggesting features for associating with a particular item. For example, the item may be a document, video, image, file or the like and the features may be keywords to be associated with (or tagged to) those items to aid later retrieval of those items from a store, using keyword search. In this case the clustering system of FIG. 1 may be used in a generative manner to generate features for associating with a given item.

Figure 14:
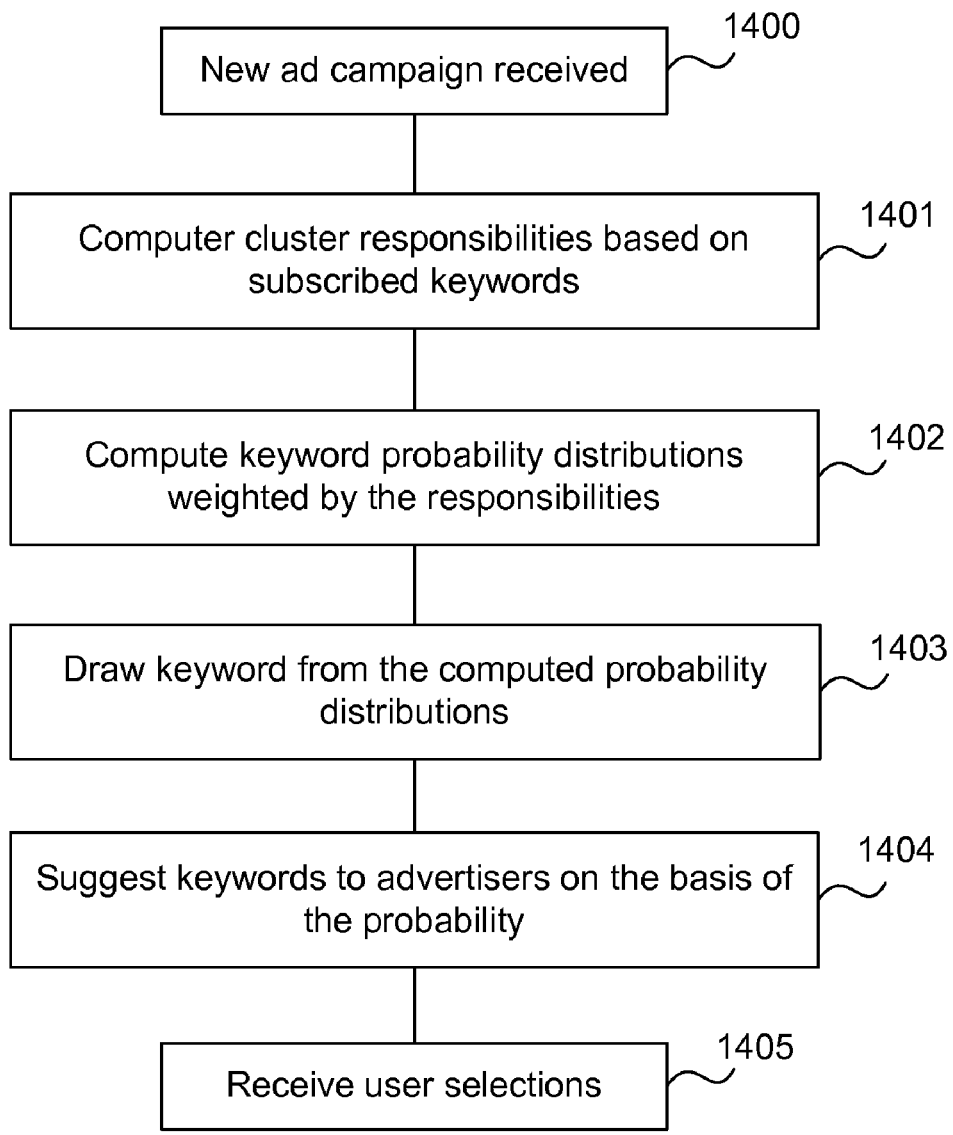
FIG. 14 is a flow diagram of a method of suggesting keywords to advertisers.

In one example, the items are advertisements and the features are keywords to which the advertisements are subscribed. In this case the goal may be to suggest to an advertiser a plurality of keywords that are related to those already subscribed to, in order to increase the reach of the advertisement. FIG. 14 is a flow diagram of a computer implemented method of achieving this using the clustering system of FIG. 1. Although this method is discussed with respect to advertisements and keywords it is also applicable to other types of item and feature.

In online advertising (for example, in paid search) ads are often displayed based on the keywords that the advertiser subscribes to. For example, the ads that are considered to be shown may be those that subscribe to keywords contained in the query issued by the user. However, even if an ad is relevant to a specific query, it is not eligible for being displayed unless it has subscribed to keywords present in the query. For the advertisers, this entails the problem of choosing the right keywords to subscribe to. In addition, the subscribed keywords have a strong influence on the so-called bidder density. The number of available ad slots is limited, with the slot at the top of the page being much more attractive than slots at the bottom of the page. The slots may be auctioned using a generalized Second Price Auction (Vickrey-Clarke-Groves), where the price charged to the advertiser is determined by the bid of the advertiser in the immediately inferior slot and the click-through rates of the ads in these consecutive slots. As a result, prices are generally higher if there is a high bidder density, that is, more advertisers participate in the auction.

In order to increase advertising revenue, there is a need to increase coverage and bidder density. This can be achieved by two mechanisms: Increase the number of relevant keywords an advertiser subscribes to, and provide tools that allow the identification of topics with a low number of advertisers.

A new advertising campaign is received 1400 comprising information about keywords the advertiser has subscribed to for a given ad. Based on the given ad, cluster responsibilities are calculated based on the keywords that are actually subscribed 1401. Keyword probability distributions are computed and weighted by the responsibility values 1402. These computed probability distributions are then used to draw keywords to be suggested to the advertiser 1403. Those keywords are then suggested 1404 with a clear ranking criterion and user selection information is received 1405 indicating whether the advertiser requires any of the suggested keywords. That feedback information is used to re-compute the cluster responsibilities 1401 and the method repeats if required.

More detail about this method is now given. The clustering system described herein can be used in a generative form, following the directed graphical such as that model shown in FIG. 7. For keyword suggestion, a specific ad represents partially observed data: An advertiser may have put some thoughts into which keywords to subscribe to, but still may have missed out on some important ones. Subscribed keywords thus act as an indicator of the advertiser's intent, but the (huge) set of non-subscribed keywords is treated as "not observed".

With this partially observed data, message passing is carried out in order to compute the probability of the unobserved keywords, given the subscribed keywords. This works as follows: Let $S \subset \{1 \ldots D\}$ be the set of all subscribed keywords in the i-th ad. All factors $\{f_{id}\}$, $d \in S$, send messages of the form of equation 2 to node $c_i$, where it is combined with the incoming message from factor h. As in the update scenario in equation 3, a responsibility of clusters for the ad is computed, but this information is only based on the keywords that are actually subscribed:

$$\tilde{r}_{il} = p(c_i = l \mid \vec{x}_i) = \frac{\gamma^l \prod_{d \in S} \mu_{ld}^{x_{id}} (1 - \mu_{ld})^{1-x_{id}}}{\sum_{j=1}^{K} \gamma_j \prod_{d \in S} \mu_{jd}^{x_{id}} (1 - \mu_{jd})^{1-x_{id}}}. \quad (6)$$

The expectation of the data (keyword) nodes that are implicitly attached to the factors $f_{id}$ in FIG. 8 are computed to obtain for the unobserved keywords $d \notin S$ $$p(x_{id} = 1 \mid \{x_{ib}\}_{b \in S}) = \sum_{j=1}^{K} \tilde{r}_{ij} \mu_{jd},$$

a linear combination of the Bernoulli profiles for the unobserved keywords, with weights based on the responsibilities computed from the observed keywords. Using this method, keywords can be suggested to users with a clear ranking criterion (the above probability or other related conservative probability estimates). For example, the mean probability $\mu$ may be used. It is also possible to compute a weighted sum of keyword distributions, and from that compute either the mean or a conservative estimate for seeing/suggesting a keyword (such as mean minus standard deviation).

In many application domains in which the clustering system described herein may be used, there is a problem caused by noise in the data. That is, noisy items can occur where that item has several associated features which are main thematic features of a given cluster and at least one completely unrelated associated feature. Because the clustering systems described herein are arranged to take into account uncertainty about item-feature associations the noisy data is not problematic as is the case with alternative clustering techniques. This is now explained with reference to an example in which the items are advertisements and the features are keywords.

In an example, the topic of a cluster is determined by examining the keywords that have the largest probability of being subscribed to. Because of the noisy nature of the data, it is possible for certain unrelated keywords to spuriously have a high average subscription probability. These keywords might have been subscribed to by noisy ads that also simultaneously subscribe to some of the main thematic keywords of the cluster. The Bayesian treatment proposed allows one to deal with this problem by providing a measure of the uncertainty about the subscription probabilities. FIG. 15 shows an example of a very homogeneous cluster where the keyword with highest mean subscription probability $\mu$—"pest control"—does not fit. However, this keyword was seen active in fewer ads attributed to this cluster. The total pseudo-count $\alpha$ of the Beta distribution represents the effective number of ads that were attributed to this cluster and subscribed to the keyword in question. Given two keywords with identical mean $\mu$ but with different $\alpha$ values, the model is more certain about the keyword with highest $\alpha$. Sorting by $\alpha$ instead of $\mu$ thus takes into account the uncertainty, and in FIG. 15 the benefits are evident: the spurious keyword is relegated to a lower position.

The clustering systems described herein provide reduced training times as compared with previous clustering systems and in addition, provide good quality results where almost all the clusters that are produced are consistent with only a few comprising a mixture of topics (as assessed by a human assessor). A comparison of the clustering system described herein with several other clustering methods: K-means, agglomerative clustering, and a maximum likelihood version of the inference for the mixture of Bernoulli profiles based on expectation-maximization (EM) is made.

The training times of different methods are assessed and visual inspection of the resulting clusters for consistency in the meanings of the most prominent keywords is carried out. Qualitatively, k-means and agglomerative clustering suffer from a collapse of most of the ads into a single cluster. This can be caused by the spurious connections between clusters introduced by ads that subscribe to incoherent sets of keywords. The methods described herein attain qualitatively better results than k-means and agglomerative clusters, managing to identify many more meaningful clusters and spreading the ads more evenly across these. Because it requires visiting the whole dataset many times, ML inference with the EM algorithm is computationally very intense. The most computationally efficient of the methods is that described herein, with training time of only 1 hour, which is short compared to the 40 hours required by EM.

The embodiments described herein provide a way of computationally efficiently learning a clustering model from data, and using the clustering model for feature suggestion. The clustering model used may be a mixture model, with product-of-Bernoulli distributions for the cluster-specific probabilities of subscribing to a feature. Previous clustering techniques require computationally demanding techniques to build the clustering model from data (for example, the Expectation-Maximization EM algorithm).

As described above a Bayesian approach is used, for example, by equipping the clustering membership probabilities with Dirichlet prior distributions, and Beta priors for the cluster-specific keyword probabilities. This allows to fully maintain uncertainty about all probabilities.

For learning the model from data, examples use approximate Bayesian inference based on Assumed Density Filtering (ADF), a technique for learning the clustering model in an online manner. Items are processed one by one; when an item is processed, the model parameters receive a (usually small) update, after which the item does not need to be re-visited. In this manner the full learning of the clustering model requires visiting each item only once. This leads to a huge speedup compared to the iterative approaches for learning such models that have been proposed in the past. When new items become available, most existing methods require a re-training from the whole augmented corpus of items, whereas the proposed method allows incrementally updating the clustering system. Furthermore, representing the model in terms of a factor graph and approximate Bayesian inference with message passing allows parallelizing the learning of the cluster model. Speed is improved further by "garbage collection" strategies that remove rarely observed features from the model.

Figure 16:
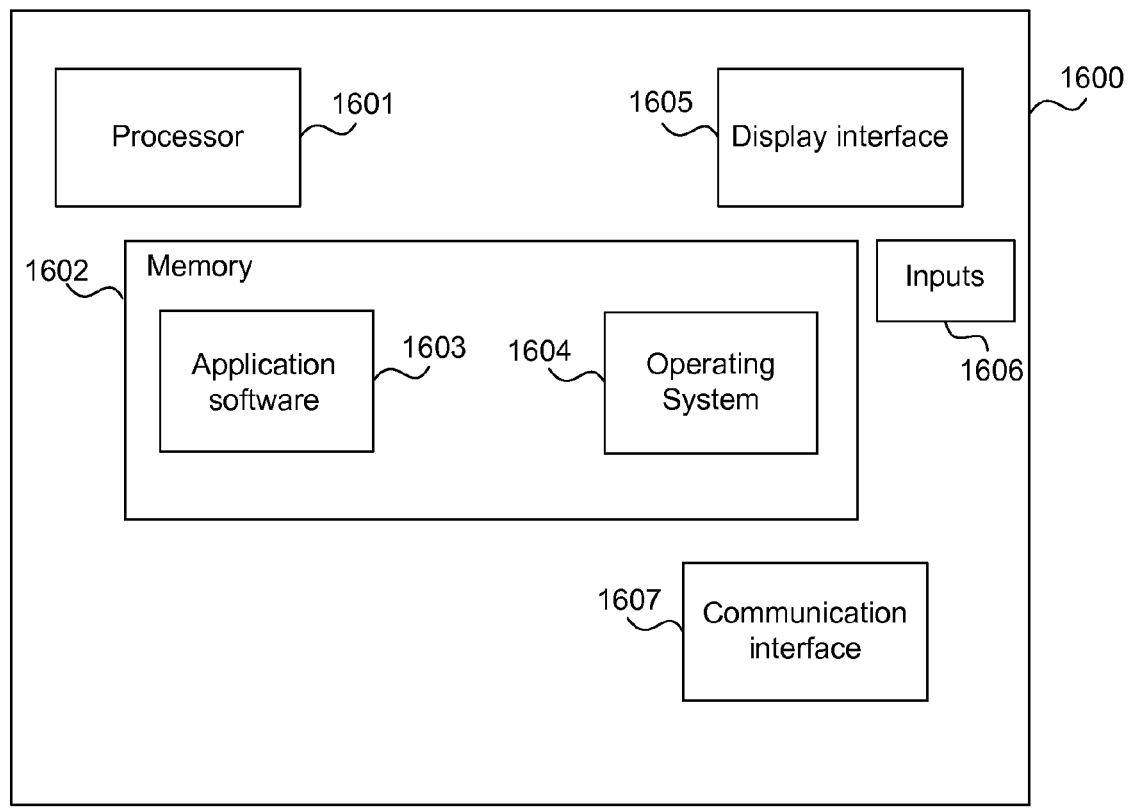
FIG. 16 illustrates an exemplary computing-based device in which embodiments of a clustering system may be implemented.

FIG. 16 illustrates various components of an exemplary computing-based device 1600 which may be implemented as any form of a computing and/or electronic device, and in which embodiments of a clustering system may be implemented.

The computing-based device 1600 comprises one or more inputs 1606 which are of any suitable type for receiving media content, Internet Protocol (IP) input, items to be clustered, feature information about items to be clustered, user input or other type of input. The device also comprises communication interface 1607 for communicating with other entities over a communications network of any suitable type. For example, these other entities may be other clustering systems.

Computing-based device 1600 also comprises one or more processors 1601 which may be microprocessors, controllers or any other suitable type of processors for processing computing executable instructions to control the operation of the device in order to cluster items. Platform software comprising an operating system 1604 or any other suitable platform software may be provided at the computing-based device to enable application software 1603 to be executed on the device.

The computer executable instructions may be provided using any computer-readable media, such as memory 1602. The memory is of any suitable type such as random access memory (RAM), a disk storage device of any type such as a magnetic or optical storage device, a hard disk drive, or a CD, DVD or other disc drive. Flash memory, EPROM or EEPROM may also be used.

An output is also provided such as an audio and/or video output to a display system integral with or in communication with the computing-based device. The display system may provide a graphical user interface, or other user interface of any suitable type although this is not essential. A display interface 1605 may be provided to control the display system.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. The software can be suitable for execution on a parallel processor or a serial processor such that the method steps may be carried out in any suitable order, or substantially simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method of clustering items, each item having at least one associated feature, the method comprising:
   storing a data structure in memory the data structure holding a plurality of clusters; for each item, one or more associated features; for each cluster, at least one cluster membership parameter related to a prior probability distribution representing belief about whether any one of the items is a member of that cluster; for each cluster and feature combination, at least one feature parameter related to a prior probability distribution representing belief about whether any one of the items in that cluster is associated with that feature;

receiving and storing an input comprising an observed item having observed associated features;

updating the parameters in the data structure on a basis of the received input and using a Bayesian update process;

identifying features that have a similar feature parameter across all clusters and using a same default value for those feature parameters; and iterating the receiving and updating for a plurality of such inputs.

2. A method as claimed in claim 1 which further comprises, subsequent to updating the parameters in the data structure, deleting the stored input and iterating the deleting together with the receiving and updating.

3. A method as claimed in claim 1 wherein the data structure is stored such that the data structure holds a cluster model which is based on a mixture of Bernoulli profiles which are products of Bernoulli distributions.

4. A method as claimed in claim 1 wherein the data structure is stored such that the data structure holds a cluster model using factor graphs.

5. A method as claimed in claim 4 wherein the data structure is stored such that the data structure holds the factor graphs as tree structures.

6. A method as claimed in claim 1 wherein the data structure is stored such that each cluster membership parameter is related to a Dirichlet distribution.

7. A method as claimed in claim 1 wherein the data structure is stored such that each feature parameter is related to a Beta distribution.

8. A method as claimed in claim 1 wherein the updating comprises using an assumed density filtering process.

9. A method as claimed in claim 1 which further comprises selecting a subset of the feature parameters and setting those feature parameters to a same default value.

10. A method as claimed in claim 1 which further comprises, within a cluster, checking whether replacing a feature parameter with a default value significantly changes results of the clustering method and, in an absence of a significant change, using the default value for that feature parameter.

11. A method as claimed in claim 1 which further comprises identifying clusters having a number of items below a specified threshold and absorbing those identified clusters into a single cluster.

12. A method as claimed in claim 1 which further comprises:

training the data structure serially using training data;

creating and storing a plurality of child copies of the data structure;

accessing a set of further training data and forming that training data into a plurality of batches;

training the child copies of the data structure in parallel using a different batch for each child copy;

updating the data structure using the trained child copies;

creating new child copies using the updated data structure;

training the new child copies using batches not previously used and updating the data structure; and repeating this process.

13. A method as claimed in claim 11 wherein the items are advertisements and the features are keywords to which the advertisements are subscribed.

14. A method as claimed in claim 13 which further comprises receiving an advertisement having a plurality of subscribed keywords and using the data structure to generate additional keywords for subscription to that advertisement.

15. A computer-implemented method of identifying additional keywords to suggest to an advertiser on a basis of an advertisement having a plurality of subscribed keywords, the method comprising:

receiving an advertisement having a plurality of subscribed keywords;

accessing a clustering system comprising a data structure holding a probabilistic cluster model having been trained on a data set comprising a plurality of advertisements having subscribed keywords and that cluster model being arranged to model uncertainty in the data set;

using the clustering system to generate keywords and associated probabilities on a basis of the received advertisement;

identifying features that have a similar feature parameter across all clusters and using a same default value for those feature parameters; and outputting the generated keywords as suggestions to the advertiser.

16. A method as claimed in claim 15 wherein an output comprises a list of at least some of the generated keywords ranked using estimates of the associated probabilities.

17. A method as claimed in claim 15 which further comprises receiving user feedback about at least some of the generated keywords and using that to revise the keyword generation process.

18. A clustering system comprising:

a memory storing a data structure holding a probabilistic cluster model having been trained on a data set comprising a plurality of documents having associated features and that cluster model being arranged to model uncertainty in the data set;

an input arranged to receive information about documents for clustering that information comprising features of those documents;

a processor to identify features that have a similar feature parameter across all clusters and using a same default value for those feature parameters; and an output arranged to provide information about clusters of the documents.

19. A clustering system as claimed in claim 18 which further comprises an input arranged to receive information about a document having specified features; and wherein the processor is arranged to use the data structure to generate at least one additional feature to be associated with the document.

* * * * *